(12) United States Patent
Vandenbosch et al.

(10) Patent No.: US 12,346,289 B1
(45) Date of Patent: Jul. 1, 2025

(54) CROSS-PLATFORM FLEXIBLE DATA MODEL FOR DYNAMIC STORAGE, MANAGEMENT, AND RETRIEVAL OF HIGH-VOLUME OBJECT DATA

(71) Applicant: Recursion Pharmaceuticals, Inc., Salt Lake City, UT (US)

(72) Inventors: Jill Theresa Vandenbosch, Toronto (CA); Conrad Banneker Owen, Toronto (CA); Aleksandar Djuric, Toronto (CA); Karanbir Singh Randhawa, Toronto (CA); Lakshmanan Arumugam, Toronto (CA); Matthew Michael Burbidge, Herriman, UT (US); Nicholas Cernek, Knoxville, TN (US); Scott Michael Nielsen, South Jordan, UT (US); Travis Bennett Martin, Salt Lake City, UT (US)

(73) Assignee: Recursion Pharmaceuticals, Inc., Salt Lake City, UT (US)

( * ) Notice: Subject to any disclaimer, the term of this patent is extended or adjusted under 35 U.S.C. 154(b) by 0 days.

(21) Appl. No.: 18/493,298

(22) Filed: Oct. 24, 2023

(51) Int. Cl.
*G06F 16/11* (2019.01)
*G06F 16/182* (2019.01)
*G06N 3/084* (2023.01)

(52) U.S. Cl.
CPC .......... *G06F 16/119* (2019.01); *G06F 16/182* (2019.01); *G06N 3/084* (2013.01)

(58) Field of Classification Search
CPC .... G06F 16/119; G06F 16/182; G06F 16/214; G06F 11/1435; G06N 3/084

USPC ................ 707/736, 741, 769, 770, 803, 812
See application file for complete search history.

(56) References Cited

U.S. PATENT DOCUMENTS

| 9,733,929 | B1* | 8/2017 | Graf | G06F 11/302 |
|---|---|---|---|---|
| 9,817,646 | B1* | 11/2017 | Chen | G06F 8/61 |
| 2006/0069683 | A1* | 3/2006 | Braddy | H04W 4/18 |
| | | | | 707/999.009 |
| 2007/0162359 | A1* | 7/2007 | Gokhale | G06Q 10/08 |
| | | | | 705/28 |
| 2008/0040388 | A1* | 2/2008 | Petri | G06F 16/907 |
| | | | | 707/999.107 |
| 2017/0052972 | A1* | 2/2017 | Karuppusamy | G06F 11/1004 |
| 2018/0239556 | A1* | 8/2018 | Cao | G06F 3/067 |

* cited by examiner

*Primary Examiner* — Phong H Nguyen
(74) *Attorney, Agent, or Firm* — Keller Preece PLLC

(57) ABSTRACT

The present disclosure relates to systems, non-transitory computer-readable media, and methods that implement a cross-platform flexible data model for dynamic storage, management, and retrieval of high-volume object data, including multi-modal machine learning datasets. Indeed, in one or more implementations, the disclosed systems operate across a variety of different non-tabular media and multiple different digital repository platforms, to efficiently and flexibly store, manage, and retrieve machine learning datasets by utilizing a dynamic cross-platform metadata database and cross-platform file location database. In particular, the disclosed systems can dynamically evolve metadata for data files of various machine learning datasets and independently manage storage locations across digital repository platforms by maintaining and utilizing a centralized cross-platform metadata database and corresponding cross-platform file location database.

20 Claims, 9 Drawing Sheets

CROSS-PLATFORM FLEXIBLE DATA MODEL FOR DYNAMIC STORAGE, MANAGEMENT, AND RETRIEVAL OF HIGH-VOLUME OBJECT DATA

BACKGROUND

Recent years have seen significant developments in hardware and software platforms for training and utilizing machine learning models. For example, conventional systems utilize large volumes of training data (including millions of digital samples) to teach machine learning models to generate intelligent predictions. Despite these recent advances, conventional systems suffer from a number of technical deficiencies, particularly with regard to operational inflexibility and inefficiency in managing large digital data volumes across computer networks to support training and implementing machine learning technologies.

For example, conventional systems are operationally inflexible in managing objects/files for machine learning datasets. To illustrate, conventional systems often store digital files within a directory structure that defines the categories, classifications, or characteristics of underlying objects. For instance, conventional systems often maintain a detailed hierarchical file structure of folders or containers corresponding to characteristics or features in order of descending detail. However, a change to one or more characteristics or features of a set of files, requires reorganization and moving of the set of files within the hierarchical file structure. For petabytes of object file data, such an approach causes a rigid roadblock to implementing flexible or dynamic changes to digital files and file metadata.

In addition, conventional systems are inflexible in the ability to store and relocate data across a variety different storage platforms while maintaining functionality/usablility. Indeed, some conventional systems often require a single unified platform (e.g., local access or a single cloud service) to the digital files. For example, conventional systems cannot store digital files for a machine learning dataset across different cloud servers or local storage resources and provide a unified approach to search and retrieve the digital files for testing or training. This also impedes the ability to transmit digital files across different storage platforms if needed for computational efficiency (e.g., to move digital files closer to computational centers for improved access efficiency), to utilize new storage vendors, or to provide digital files to designated devices. Although some conventional systems rely on clients to know the location of where files are uploaded or stored, this approach undermines scalability and reliability while also impeding the ability to flexibly and dynamically relocate files without individual client involvement. Indeed, it is difficult to quickly iterate on client-drive solutions due to the coordination overhead required to update clients.

Furthermore, conventional systems often duplicate digital files for machine learning datasets, which undermines reliability and accuracy. For instance, it is common for digital files to be duplicated across multiple storage locations in conventional systems. Thus, individual clients or servers can access different digital files (without consistency among contents or versioning), which can undermine accuracy of resulting machine learning models or machine learning predictions.

As just mentioned, conventional systems are often computationally inefficient. Indeed, conventional systems often locate large digital datasets in inefficient storage repositories (e.g., due to individual client needs for accessing the digital files or to provide a single, centralized repository). Accordingly, conventional systems often require inefficient data transmission and access because the data files are maintained at sub-optimal locations (e.g., a far distance from the compute limit the ability to move digital files to the most efficient require significant resources). Furthermore, as discussed above, conventional systems that rely on a defined file structures require significant computational resources to maintain and modify with respect to dynamic metadata of machine learning datasets.

SUMMARY

Embodiments of the present disclosure provide benefits and/or solve one or more of the foregoing or other problems in the art with systems, non-transitory computer-readable media, and methods for implementing a cross-platform flexible data model for dynamic storage, management, and retrieval of high-volume object data. In particular, the disclosed system implements a dynamic cross-platform metadata database together with a cross-platform file location database for flexibly evolving metadata associated with large machine learning data volumes independently from moving and managing storage locations of the machine learning data volumes within various digital repository platforms. Indeed, the disclosed systems can manage petabytes or exabytes of machine learning files across a variety of different media, including genomic data, transcriptomic data, proteomic data (indicating protein characteristics and/or interactions with chemical compounds), phenomic digital images (portraying different phenotypes corresponding to different perturbations), invivomic data (high-definition video records and other sensor readings of animal reactions to different biological experiments), and/or multi-dimensional machine learning embeddings of various input features. Further the disclosed systems can efficiently manage these large machine learning data sets stored across different digital repository platforms (various local servers, remote cloud storage services, third party servers, and/or dedicated machine learning devices), while allowing for efficient identification and retrieval of machine learning datasets matching desired characteristics, flexible movement of the machine learning datasets across different repository platforms, and dynamic index/metadata modification from a centralized cross-platform metadata database.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
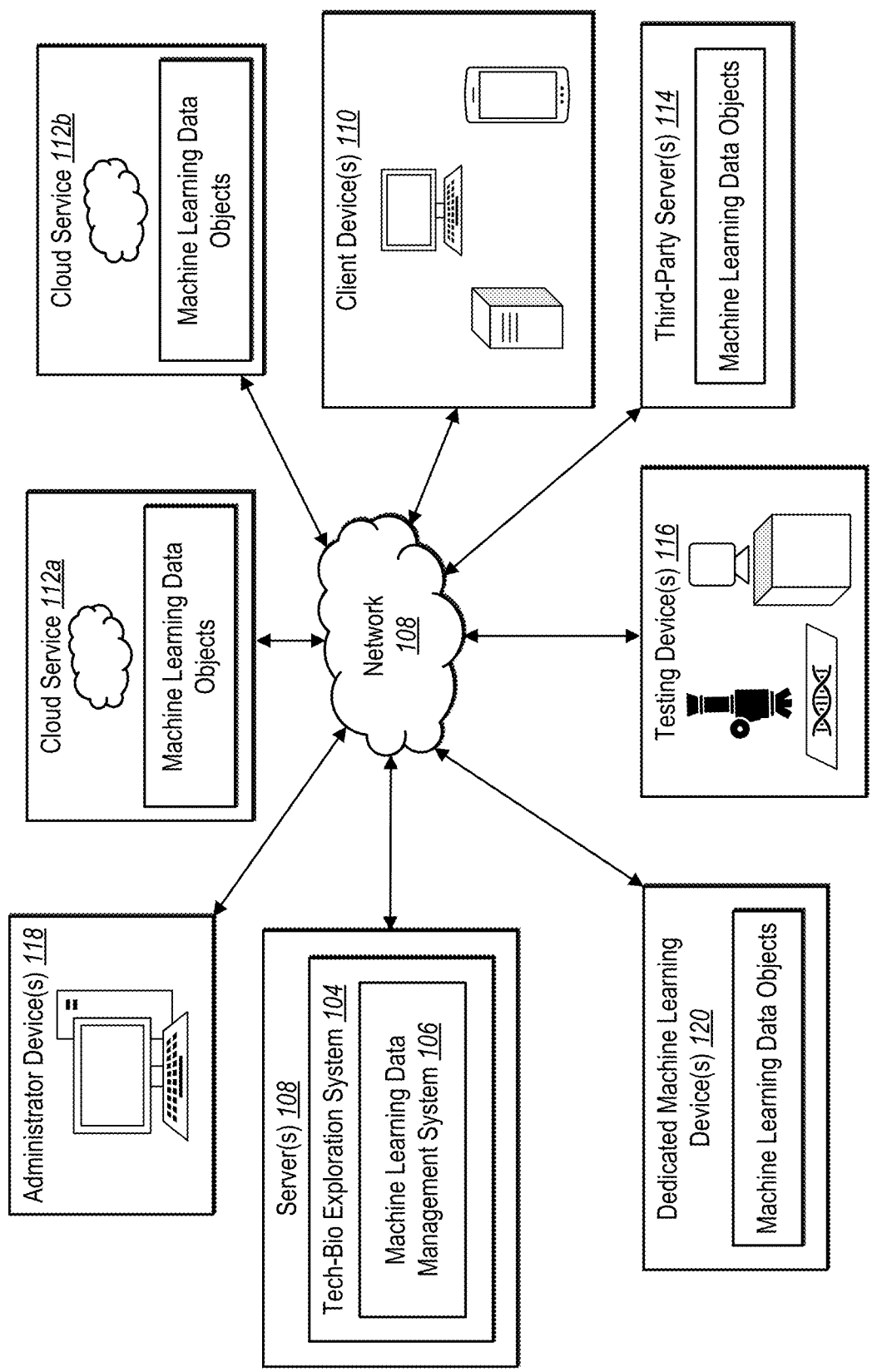
FIG. 1 illustrates a schematic diagram of a system environment in which a machine learning data management system can operate in accordance with one or more embodiments.

This disclosure describes one or more embodiments of a machine learning data management system that implements a cross-platform flexible data model for dynamic storage, management, and retrieval of high-volume object data, including multi-modal machine learning datasets. Indeed, in one or more implementations, the machine learning data management system operates across a variety of different non-tabular media, including proteomic modeling of protein expression and/or geometry, phenomic digital images of cellular biology, invivomic digital videos of animals, and/or multi-dimensional machine learning embeddings corresponding to various features. Moreover, in one or more embodiments, the machine learning data management system manages these machine learning datasets across multiple different digital repository platforms, including various local servers, multiple cloud service providers, third-party data servers, and/or dedicated machine learning devices. The machine learning data management system can efficiently and flexibly store, manage, and retrieve machine learning datasets by utilizing a dynamic cross-platform metadata database and cross-platform file location database. In particular, the machine learning data management system can dynamically evolve metadata for data files of various machine learning datasets and independently manage storage locations across digital repository platforms by maintaining and utilizing a centralized cross-platform metadata database and corresponding cross-platform file location database.

To illustrate, in one or more implementations, the machine learning data management system receives (from a requestor device) a machine learning dataset request that includes one or more defining characteristics of a machine learning dataset. The machine learning data management system can utilize the cross-platform metadata database to search for digital files stored across various digital repository platforms that align to the desired characteristics for the machine learning dataset. The machine learning data management system can then utilize the cross-platform file location database to determine digital storage locations within the plurality of digital repository platforms. Moreover, the machine learning data management system can generate a machine learning dataset response that indicates the digital storage locations for individual digital files of the machine learning dataset for training or testing a machine learning model.

In addition to generating machine learning dataset responses, the machine learning data management system can also generate and manage the cross-platform metadata database and the cross-platform file location database. In particular, the machine learning data management system can decouple storage from retrieval and allow for independent modification of metadata associated with digital files stored across a plurality of digital repository platforms and modification of the storage locations within the digital repository platforms. Accordingly, clients that interact with the machine learning data management system can provide and request machine learning files without knowing the location of any particular data.

Thus, for example, the machine learning data management system can independently and seamlessly migrate machine learning files from a first digital storage location (e.g., a first cloud service) to a second digital storage location (e.g., a second cloud service) without coordinating across client devices. Rather, the machine learning data management system can update the cross-platform file location database to flexibly and efficiently reflect the new storage location in responding to future machine learning requests. Similarly, the machine learning data management system can also independently modify metadata for machine learning data files (i.e., without having to access, pull, or modify the files themselves or a corresponding storage directory). For example, the machine learning data management system can modify a metadata field or column within the cross-platform metadata database to make machine learning datasets easier (and more accurate) to build, without requiring a change the underlying files or the file architecture in which the files are stored.

As suggested by the foregoing discussion, the machine learning data management system provides a variety of technical advantages relative to conventional systems. For example, the machine learning data management system can improve operational flexibility relative to conventional systems. As just mentioned, by using a cross-platform metadata base together with a cross-platform file location database the machine learning data management system can independently modify metadata features of a digital file without altering a hierarchical file/feature structure and without modifying digital data stored across a variety of different digital repositories. To illustrate, the machine learning data management system provide forward compatible metadata schema evolution. Indeed, the machine learning data management system can efficiently and flexibly add, remove, or modify metadata columns/fields within the cross-platform metadata base to more effectively identify and retrieve digital files for large machine learning datasets. Moreover, the machine learning data management system 106 can provide improved search functionality on metadata, such as range matching on number and datetime fields (e.g., for digital video data).

In addition, the machine learning data management system allows for flexible and accurate storage, retrieval, and relocation across different digital repository platforms. By using a cross-platform metadata base together with a cross-platform file location database, the machine learning data management system can accurately identify pertinent digital files and identify their storage location within various digital repository platforms for building large machine learning datasets. Moreover, the machine learning data management system can avoid duplicate files or inconsistencies by designating a source of truth for individual digital files. Indeed, in one or more embodiments, the machine learning data management system can utilize required metadata fields and content hashes to provide a uniqueness guarantee for each individual digital file (e.g., thus providing immutable blobs). Moreover, the machine learning data management system can still allow for multi-storage of different digital files through accurate and consistent cataloging/indexing to allow for efficient retrieval from the most efficient storage source.

Furthermore, the machine learning data management system can flexibly transmit digital files across digital repository platforms by updating the centralized cross-platform file location database. Accordingly, the machine learning data management system can transfer digital files to improve computational efficiency, to utilize different storage services, and/or to utilize specialized computational devices. Furthermore, the machine learning data management system improves flexibility, scalability, and reliability because individual clients can operate without knowing or tracking particular file locations across digital repository platforms.

Furthermore, the machine learning data management system also improves computational efficiency. Indeed, the machine learning data management system can modify storage locations and update the cross-platform file location to maintain functionality. Thus, the machine learning data management system can improve efficiency in data transmission and storage by storing digital files with the most efficient repository (e.g., the server or service geographically closest to a particular compute need). Furthermore, the machine learning data management system can independently and efficiently modify metadata corresponding to digital files for large machine learning datasets without expending excessive computational resources in maintaining or modifying files within a hierarchical structure. In short, the machine learning data management system can handle any blob, at any storage scale, supported by one API.

Additional detail regarding a machine learning data management system 106 will now be provided with reference to the figures. In particular, FIG. 1 illustrates a schematic diagram of a system environment in which the machine learning data management system 106 can operate in accordance with one or more embodiments.

As shown in FIG. 1, the environment includes server(s) 102 (which includes a tech-bio exploration system 104 and the machine learning data management system 106), a network 108, client device(s) 110, cloud service(s) 112a-112b, third-party server(s) 114, testing device(s) 116, administrator device(s) 118, and dedicated machine learning device(s) 120. As further illustrated in FIG. 1, the various computing devices within the environment can communicate via the network 108. Although FIG. 1 illustrates the machine learning data management system 106 being implemented by a particular component and/or device within the environment, the machine learning data management system 106 can be implemented, in whole or in part, by other computing devices and/or components in the environment (e.g., the administrator device(s) 118, the client device(s) 110). Additional description regarding the illustrated computing devices is provided with respect to FIG. 9 below.

As shown in FIG. 1, the server(s) 102 (e.g., one or more local servers operated by a particular entity) can include the tech-bio exploration system 104. In some embodiments, the tech-bio exploration system 104 can determine, store, generate, and/or display tech-bio information including maps of biology, biology experiments from various sources, and/or machine learning tech-bio predictions. For instance, the tech-bio exploration system 104 can analyze data signals corresponding to various treatments or interventions (e.g., compounds or biologics) and the corresponding relationships in genetics, proteomics, phenomics (i.e., cellular phenotypes), and invivomics (e.g., expressions or results within a living animal).

For instance, the tech-bio exploration system 104 can generate and access experimental results corresponding to gene sequences, protein shapes/folding, protein/compound interactions, phenotypes resulting from various interventions or perturbations (e.g., gene knockout sequences or compound treatments), and/or invivo experimentation on various treatments in living animals. By analyzing these signals (e.g., utilizing various machine learning models), the tech-bio exploration system 104 can generate or determine a variety of predictions and inter-relationships for improving treatments/interventions.

To illustrate, the tech-bio exploration system 104 can generate maps of biology indicating biological inter-relationships or similarities between these various input signals to discover potential new treatments. For example, the tech-bio exploration system 104 can utilize machine learning and/or maps of biology to identify a similarity between a first gene associated with disease treatment and a second gene previously unassociated with the disease based on a similarity in resulting phenotypes from gene knockout experiments. The tech-bio exploration system 104 can then identify new treatments based on the gene similarity (e.g., by targeting compounds the impact the second gene). Similarly, the tech-bio exploration system 104 can analyze signals from a variety of sources (e.g., protein interactions, or invivo experiments) to predict efficacious treatments based on various levels of biological data.

The tech-bio exploration system 104 can generate GUIs comprising dynamic user interface elements to convey tech-bio information and receive user input for intelligently exploring tech-bio information. Indeed, as mentioned above, the tech-bio exploration system 104 can generate GUIs displaying different maps of biology that intuitively and efficiently express complex interactions between different biological systems for identifying improved treatment solutions. Furthermore, the tech-bio exploration system 104 can also electronically communicate tech-bio information between various computing devices.

As shown in FIG. 1, the tech-bio exploration system 104 can include a system that facilitates various models or algorithms for generating maps of biology (e.g., maps or visualizations illustrating similarities or relationships between genes, proteins, diseases, compounds, and/or treatments) and discovering new treatment options over one or more networks. For example, the tech-bio exploration system 104 collects, manages, and transmits data across a variety of different entities, accounts, and devices. In some cases, the tech-bio exploration system 104 is a network system that facilitates access to (and analysis of) tech-bio information within a centralized operating system. Indeed, the tech-bio exploration system 104 can link data from different network-based research institutions to generate and analyze maps of biology.

As shown in FIG. 1, the tech-bio exploration system 104 can include a system that comprises the machine learning data management system 106 that generates, stores, manages, transmits, and analyzes machine learning model datasets. For example, the machine learning data management system 106 can generate machine learning datasets and utilize the machine learning datasets to train, test, or implement machine learning models (e.g., for generating maps of biology and discovering new treatment options). Moreover, as discussed in greater detail below, the machine learning data management system 106 can generate and manage a cross-platform metadata database and a cross-platform file location database for storing and retrieving digital files in generating machine learning datasets.

As used herein, the term "machine learning model" includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques (e.g., supervised or unsupervised learning) to improve in accuracy and/or effectiveness. Example machine learning models include various types of decision trees, support vector machines, Bayesian networks, random forest models, or neural networks (e.g., deep neural networks, generative adversarial neural networks, convolutional neural networks, recurrent neural networks, or diffusion neural networks). Similarly, the term "machine learning data" refers to information, data, or files generated or utilized by a machine learning model. Machine learning data can include training data, machine learning parameters, or embeddings/predictions generated by a machine learning model.

As also illustrated in FIG. 1, the environment includes the client device(s) 110. For example, the client device(s) 110 may include, but is not limited to, a mobile device (e.g., smartphone, tablet) or other type of computing device, including those explained below with reference to FIG. 9. Additionally, the client device(s) 110 can include a computing device associated with (and/or operated by) user accounts for the tech-bio exploration system 104. Moreover, the environment can include various numbers of client devices that communicate and/or interact with the tech-bio exploration system 104 and/or the machine learning data management system 106.

Furthermore, in one or more implementations, the client device(s) 110 includes a client application. The client application can include instructions that (upon execution) cause the client device(s) 110 to perform various actions. For example, a user of a user account can interact with the client application on the client device(s) 110 to access tech-bio information, initiate a request for a machine learning dataset, initiate training of a machine learning model utilizing a machine learning dataset, and/or generate GUIs comprising a machine learning dataset and/or machine learning predictions/results.

As further shown in FIG. 1, the environment includes the network 108. As mentioned above, the network 108 can enable communication between components of the environment. In one or more embodiments, the network 108 may include a suitable network and may communicate using a various number of communication platforms and technologies suitable for transmitting data and/or communication signals, examples of which are described with reference to FIG. 9. Furthermore, although FIG. 1 illustrates computing devices communicating via the network 108, the various components of the environment can communicate and/or interact via other methods (e.g., communicate directly).

As mentioned previously, in one or more implementations, the machine learning data management system 106 generates and accesses machine learning objects, such as results from biological assays. As shown, in FIG. 1, the machine learning data management system 106 can communicate with testing device(s) 116 to obtain and then store this information. For example, the tech-bio exploration system 104 can interact with the testing device(s) 116 that include intelligent robotic devices and camera devices for generating and capturing digital images of cellular phenotypes resulting from different perturbations (e.g., genetic knockouts or compound treatments of stem cells). Similarly, the testing device(s) can include camera devices and/or other sensors (e.g., heat or motion sensors) capturing real-time information from animals as part of invivo experimentation. The tech-bio exploration system 104 can also interact with a variety of other testing device(s) such as devices for determining, generating, or extracting gene sequences or protein information.

As shown in FIG. 1, the environment also includes a variety of computing devices (i.e., digital repository platforms) capable of storing machine learning data objects. As used herein, the term digital repository platform includes a storage device or set of storage devices (e.g., for storing digital files corresponding to machine learning datasets). In particular, a digital repository platform can include a set of storage devices at a particular location or controlled by a particular entity. Thus, for example, a digital repository platform can include a cloud service (e.g., Amazon Web Services), a local server, or a third-party server.

For example, with regard to the server(s) 102, local servers operating the tech-bio exploration system 104 can store machine learning data objects on various servers distributed geographically across different parts of the country or world. In addition, the cloud service(s) 112a-112b can also store machine learning data objects. For example, the machine learning data management system 106 can utilize a cloud storage service provider and transmit machine learning data objects to the cloud service(s) 112a-112b. Further, the machine learning data management system 106 can interact with third-party server(s) 114 (e.g., servers operated and owned by separate entities, such as a coordinating partner with its own biological data). The machine learning data management system 106 can collaborate with third parties to generate machine learning datasets from machine learning data objects retained on the third-party server(s) 114. In addition, the machine learning data management system 106 can also interact with dedicated machine learning device(s) 120. For example, the dedicated machine learning device(s) 120 can include computing devices or virtual machines dedicated to training or implementing large-scale machine learning models. In some implementations, the machine learning data management system 106 can also store machine learning data objects on the dedicated machine learning device(s) 120. Moreover, in some embodiments, the client device(s) 110 also store machine learning data objects.

As shown in FIG. 1, the environment also includes administrator device(s) 118. For example, the machine learning data management system 106 can utilize the administrator device(s) 118 to control various functions or operations in storing or accessing digital files (e.g., non-tabular electronic records, documents, or objects). To illustrate, the administrator device(s) 118 can select storage locations in particular digital repository platforms for certain digital files. In addition, the administrator device(s) 118 can identify or select modified storage locations for particular digital files. Similarly, the administrator device(s) 118 can receive registration queries for new digital file types, determine metadata to track for the new digital file types, and determine appropriate taxonomies or schemas for storing the metadata within a cross-platform metadata database. In addition, the administrator device(s) 118 can approve, reject, or modify registration proposals.

As mentioned above, in one or more implementations, the machine learning data management system 106 receives machine learning dataset requests (e.g., from the client device(s) 110) and generates machine learning dataset responses with digital files corresponding to the request. For example, FIG. 2 illustrates the machine learning data management system 106 generating a machine learning dataset response in accordance with one or more embodiments.

Figure 2:
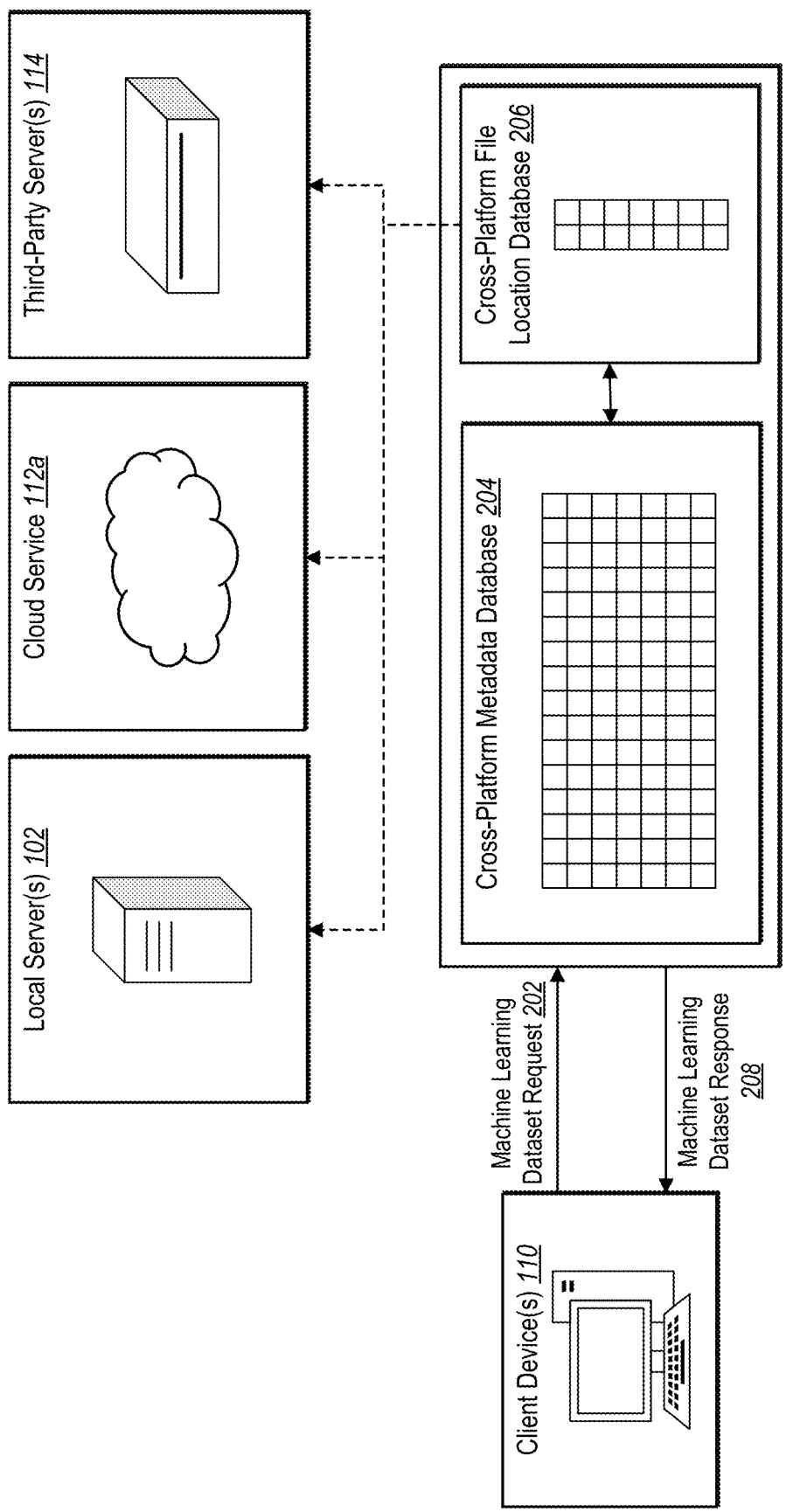
FIG. 2 illustrates utilizing a cross-platform metadata database and cross-platform file location database to generate a machine learning dataset response for a machine learning dataset request in accordance with one or more embodiments.

In particular, FIG. 2 illustrates the machine learning data management system 106 receiving a machine learning dataset request 202 from the client device(s) 110 (i.e., a requestor device). The machine learning dataset request 202 can include a query or other data transmission that includes one or more characteristics or features for building/defining a machine learning dataset. For example, the machine learning dataset request 202 can include a particular experiment ID, a range of plate IDs (corresponding to plates portraying particular cellular phenotypes from biological assays), a time range, a set of compounds, a set of genes (e.g., a knockout gene), a set of proteins, or another characteristic or feature for building a machine learning dataset.

The machine learning data management system 106 can receive a machine learning dataset request from a variety of requestor devices. For example, the machine learning data management system 106 can receive a machine learning dataset request from a client device operated by an individual user or from a back-end server operating executable instructions to gather a particular machine learning dataset.

As illustrated, upon receiving the machine learning dataset request 202, the machine learning data management system 106 utilizes a cross-platform metadata database 204 to identify the pertinent digital files corresponding to the characteristic identified in the machine learning dataset request 202. In particular, the machine learning data management system 106 searches the cross-platform metadata database 204 utilizing one or more characteristics in the machine learning dataset request 202 to identify the digital files (or identifiers such as a file ID) for building the machine learning dataset. For instance, the machine learning data management system 106 can search for digital files by matching on a part or entirety of required metadata. Similarly, the machine learning data management system 106 can search by matching on file/blob id or metadata id.

As used herein, a "cross-platform metadata database" includes a data structure (e.g., a database, array, or tabular data file) that includes metadata for a plurality of digital files (e.g., a plurality of digital files stored across different digital repository platforms). Thus, for example a cross-platform metadata database includes a database comprising metadata fields for different digital files stored in at least two digital repository platforms (e.g., columns corresponding to different types of metadata and rows corresponding to different digital files).

Moreover, as used herein, the term "digital file" refers to a digital record, document, or object (e.g., corresponding to a machine learning dataset). As mentioned above, digital files can include a variety of non-tabular data, such as phenomic digital images (e.g., microscope images portraying a phenotype of one or more cells resulting from a particular perturbation), invivomic digital videos (e.g., digital videos and/or other sensor data corresponding to a live organism/animal), machine learning embeddings (such as multi-dimensional feature vectors), and/or three-dimensional protein and/or compound information/models. Digital files can also include specialized files from testing devices (e.g., lab equipment) or digital chemistry.

As used herein, the term "machine learning dataset" refers to a set of digital files used to train, test, or implement a machine learning model (and/or generated from a machine learning model). For example, a machine learning dataset can include features or characteristics (e.g., input features corresponding to an assay) as well as observed/ground truth results (e.g., the observed results corresponding to the assay). A machine learning dataset can also include machine learning embeddings generated from a machine learning model (e.g., multi-dimensional feature vectors generated by an embedding model). Thus, digital files corresponding to a machine learning dataset include the digital files reflecting features, characteristics, and/or observed results utilized to train, test, or implement a machine learning model (or resulting from implementation of a machine learning model).

In one or more embodiments, the machine learning data management system 106 performs a search of the cross-platform metadata database based on the characteristics in the machine learning dataset request 202. Based on the search, the machine learning data management system 106 can extract identifiers for digital files that share the particular characteristics defining the machine learning database. Thus, for example, the machine learning data management system 106 can identify file identifiers for all digital files reflecting a particular experiment between a two month data range.

Upon identifying the pertinent digital files, the machine learning data management system 106 can utilize a cross-platform file location database 206 to identify file locations for the identified files. A cross-platform file location database comprises a data structure (e.g., a database, array, or tabular data file) that includes file locations for a plurality of digital files (e.g., a plurality of digital files stored across different digital repository platforms). Thus, for example, a cross-platform file location database includes a database comprising digital file identifiers (e.g., in a first column) and corresponding file locations (e.g., in a second column) within different digital repository platforms.

Thus, the machine learning data management system 106 can search for digital file identifiers (extracted from the cross-platform metadata database) in the cross-platform file location database to determine the pertinent file locations. To illustrate, the machine learning data management system 106 can determine that a first digital file is located in a first digital repository platform, such as the server(s) 108, a second digital file is located in a second digital repository platform, such as the cloud service(s) 112a, and a third digital file is located in a third digital repository platform, such as the third-party server(s) 114 (and/or another digital repository platform such as the cloud service(s) 112b).

As shown, the machine learning data management system 106 can generate and provide a machine learning dataset response 208 to the client device(s) 110. In particular, the machine learning dataset response 208 can include the digital storage locations of the digital files (within the plurality of digital repository platforms) for the machine learning dataset. To illustrate, the machine learning dataset response 208 includes links, URLs, or pointers to digital file locations. The client device(s) 110 can utilize the machine learning dataset response to access the pertinent digital files from the digital file locations. For example, the client device(s) 110 can download the digital files or utilize an additional service to gather the files from the digital file locations. Moreover, the machine learning data management system 106 can utilize the digital files to train, test, or implement a machine learning model.

Thus, in one or more implementations, the machine learning data management system 106 utilize a software development kit to write digital files to a bucket. If the write completes successfully, the software development kit posts the metadata and location to a corresponding application programming interface (API). Later, when the client wants to retrieve their digital file(s), the clients use the SDK, which gets the correct location per a metadata query match, then downloads the digital from that location.

Figure 3:
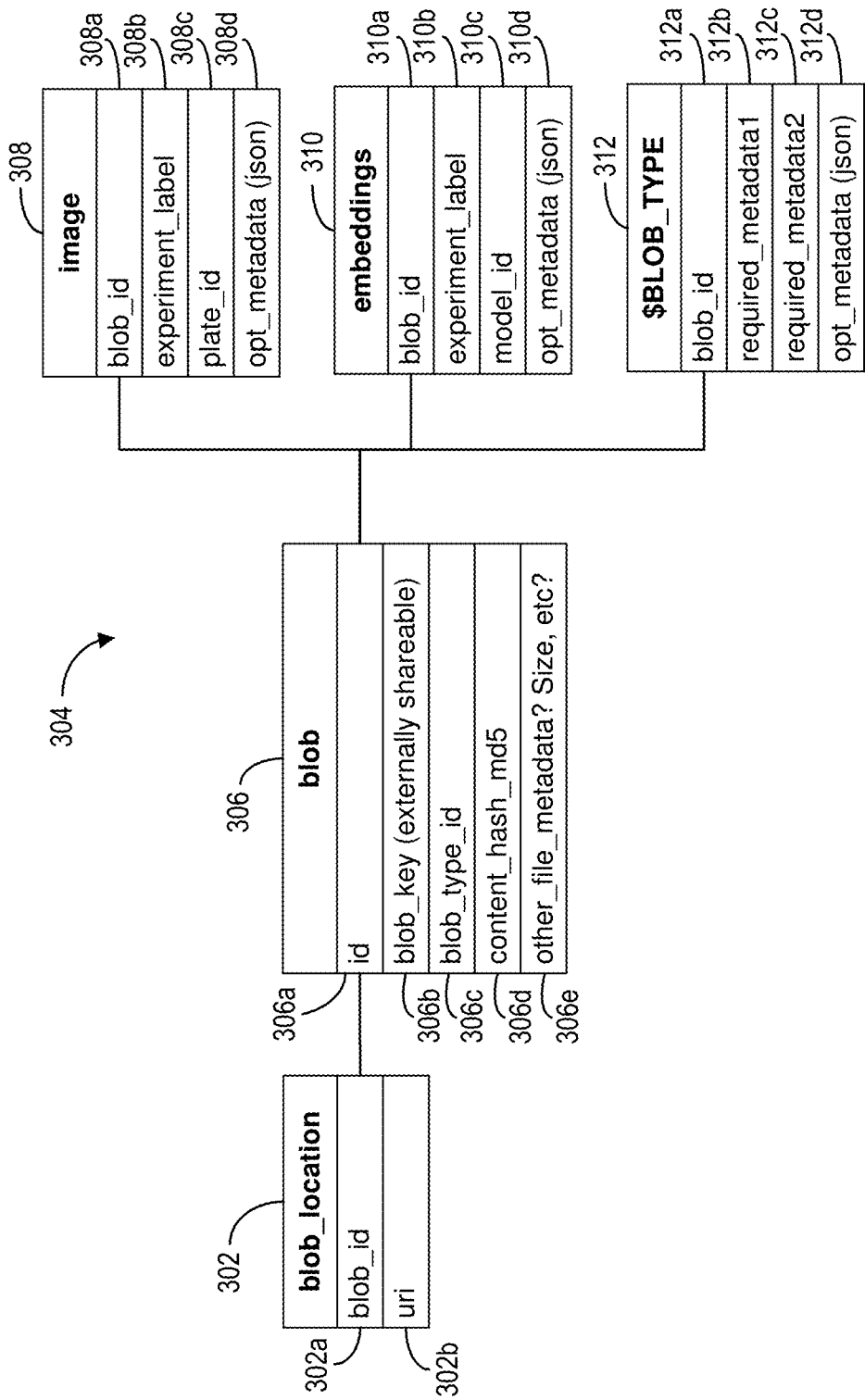
FIG. 3 illustrates an example cross-platform flexible data model that includes a cross-platform metadata database and cross-platform file location database in accordance with one or more embodiments.

As just mentioned, the machine learning data management system 106 can utilize a cross-platform metadata database and a cross-platform file location database. FIG. 3 illustrates an example cross-platform flexible data model that includes a cross-platform metadata database and cross-platform file location database in accordance with one or more embodiments.

In particular, FIG. 3 illustrates a cross-platform file location database 302 that includes a field 302a for a digital file identifier (i.e., "blob_id") as well as a field 302b for a storage location (i.e., a "uri" or file path). Although the cross-platform file location database 302 illustrates only a single entry for a digital file identifier/storage location pair, in one or more implementations, the cross-platform file location database 302 includes thousands or millions of entries. For instance, the cross-platform file location database 302 can include a first column of digital file identifiers and a second column of storage locations.

FIG. 3 also illustrates a cross-platform metadata database 304, that includes a variety of metadata. In relation to FIG. 3, the cross-platform metadata database 304 includes a variety of nested entries/fields (or separate metadata databases) corresponding to different digital file types, including a general object metadata portion 306, an image object metadata portion 308 (for digital image file types), an embeddings metadata portion 310 (for machine learning embedding file types), and an additional object type portion 312 (for other digital file types such as digital videos). In particular, the general object metadata portion 306 includes a field 306a for a digital file identifier, a field 306b for a shareable key (e.g., a key to permit access to a particular digital file), a field 306c for a digital file type identifier (e.g., phenotype digital image, digital video, or some other type), a field 306d for a content hash, a field 306e for other general digital file metadata. Indeed, as mentioned above, in some implementations, the machine learning data management system 106 generates a content hash that uniquely identifies each digital file. This approach helps to avoid storing identical objects multiple times. This approach also makes it easier for the machine learning data management system 106 to manage multiple pointers to a single digital file.

The image object metadata portion 308 (e.g., a phenotype digital image) includes a field 308a for a digital file identifier, a field 308b for an experiment label, a field 308c for a plate identifier (e.g., a plate utilized to capture a phenotype digital image), and a field 308d for optional metadata that clients include for the digital image file (e.g., for phenotype digital images).

The embedding object metadata portion 310 includes a field 310a for a digital file identifier, a field 310b for an experiment identifier, a field 310c for a model identifier (e.g., a type or identifier corresponding to a machine learning model utilized to generate the machine learning embedding), and a field 310d for optional metadata that clients include for the embedding digital file.

Similarly, the additional object type portion 312 includes field 312a for a digital file identifier, a field 312b for a first item of required metadata (e.g., required metadata identified at registration for a particular digital file type), a field 312c for a second item of required metadata (e.g., required metadata identified at registration), and a field 312d for optional metadata that clients include for the embedding digital file. The machine learning data management system 106 can determine different types of required or optional metadata for different digital file types at the time of registering the different digital file types from different clients.

In one or more implementations, the machine learning data management system 106 can also transfer metadata from optional fields to required fields. For example, the machine learning data management system 106 can receive a request to make optional metadata required metadata. In response, the machine learning data management system 106 can search and extract content from optional metadata fields and then move the extracted contents to corresponding labeled metadata fields.

In some implementations, the machine learning data management system 106 generates and manages an access log or audit log corresponding to queries for digital files. For instance, the machine learning data management system 106 can identify the particular client devices and/or users requesting particular digital files. The machine learning data management system 106 can also identify those client devices/users that have received machine learning dataset responses and/or accessed particular digital files. The machine learning data management system 106 can gather and report this information as part of a user interface (e.g., as part of a report for a particular client device or group, for a particular digital file or group of files, or as a general report of a number or type of requests across the system).

Although FIG. 3 illustrates a single set of exemplary fields for the cross-platform metadata database 304, the machine learning data management system 106 can include thousands or millions of entries within the cross-platform metadata database 304. For instance, in some implementations, the machine learning data management system 106 utilizes columns defining field categories and rows corresponding to particular digital files with millions of field entries.

Although FIG. 3 illustrates the general object metadata portion 306, the image metadata portion 308, the embeddings object metadata portion 310, and the additional object type portion 312 as part of a nested (multi-dimensional) database or as separate databases, it will be appreciated that the machine learning data management system 106 can utilize a variety of data structure organizations for a cross-platform metadata database. For instance, in some implementations, the machine learning data management system 106 does not utilize nested information, a multi-dimensional database, or separate databases for different metadata, but includes all information/metadata for all digital file types in a two-dimensional array or database. For instance, the machine learning data management system 106 can utilize different columns for each metadata type and different rows for each digital file.

In some implementations, the machine learning data management system 106 can implement permissioning protocols for stored digital files and entries within the cross-platform metadata database and cross-platform file location database. Indeed, in one or more embodiments, the machine learning data management system 106 stores sensitive data corresponding to various different entities with strict controls regarding access or viewership for different digital files.

The machine learning data management system 106 can control access to both the digital files and metadata utilizing such permissioning. For instance, the machine learning data management system 106 can utilize row-based access controls to prohibit access to rows of the cross-platform metadata database and/or the cross-platform file location database based on permissions of individual users.

As mentioned above, in one or more implementations, the machine learning data management system 106 generates a cross-platform metadata database and/or a cross-platform file location database and updates these databases upon collecting additional data objects. For example, FIG. 4 illustrates generating/updating a cross-platform metadata database and a cross-platform file location database for a new digital file in accordance with one or more embodiments.

Figure 4:
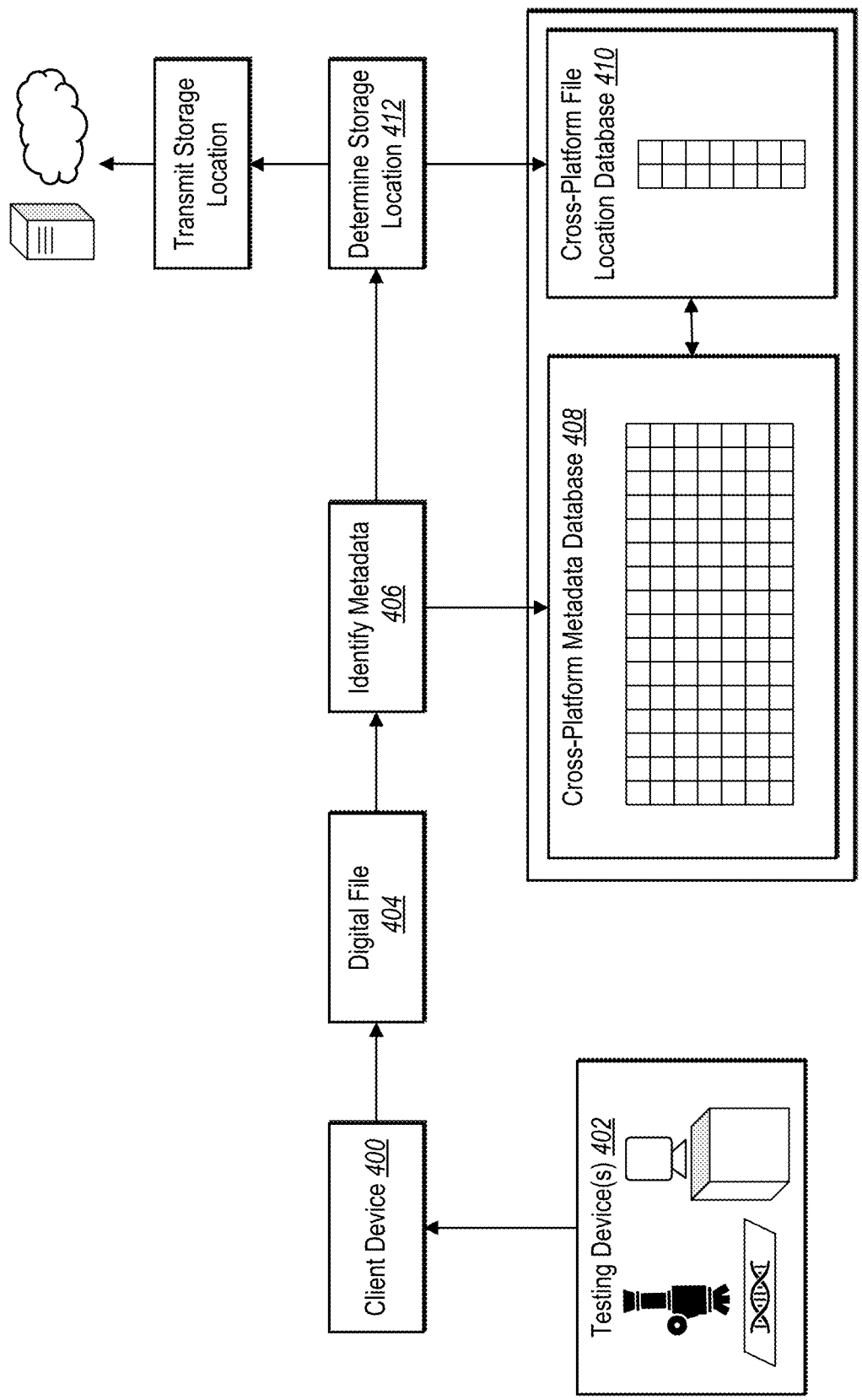
FIG. 4 illustrates generating/updating a cross-platform metadata database and a cross-platform file location database for a new digital file in accordance with one or more embodiments.

As shown in FIG. 4, the machine learning data management system 106 utilizes testing device(s) 402 and/or a client device 400 to generate or identify a digital file 404 (e.g., a new machine learning data object). For instance, the testing device(s) 402 can capture a phenotype digital image and transfer the phenotype digital images to a client device 400 for upload to a holding storage device (e.g., an inbox bucket) for further processing (e.g., to store, confirm that the uploaded metadata confirms with a registration template/schema, and index before transmitting to a final storage location). Although FIG. 4 illustrates the testing device(s) 402 generating the digital file 404, the machine learning data management system 106 can also utilize a machine learning model (e.g., to generate an embedding), the client device 400, or another computing device (e.g., another third-party server to transfer a new digital file) in generating or accessing the digital file 404.

In response to identifying the digital file 404 (e.g., receiving the digital file 404 in an inbox), the machine learning data management system 106 performs an act 406 of identifying metadata. In particular, the machine learning data management system 106 can extract metadata from the digital file 404 (e.g., by scraping metadata from the digital file 404). For example, the term "metadata" includes data that provides information about (e.g., describes) a digital file. In one or more embodiments, the machine learning data management system 106 receives additional metadata with the digital file 404. For example, in registering a particular digital file type, the machine learning data management system 106 can identify required metadata. The machine learning data management system 106 can require a client device to include the required metadata with the digital file 404 in order to store the digital file 404 or log the digital file 404 within a database. In some instances, the machine learning data management system 106 rejects the digital file 404 if the required metadata is not included or received with the digital file 404.

As shown in FIG. 4, the machine learning data management system 106 generates/updates a cross-platform metadata database 408 (e.g., the cross-platform metadata database 304) based on the metadata. For example, the machine learning data management system 106 determines a digital file identifier for the digital file 404, adds a row for the digital file identifier/digital file 404 in the cross-platform metadata database 408 and populates metadata fields in the cross-platform metadata database 408 based on the metadata corresponding to the digital file 404. For example, the machine learning data management system 106 populates a time, plate, order in read ID, microscope, lens, magnification, experiment identifier, etc. within corresponding fields of the cross-platform metadata database 408.

As illustrated, the machine learning data management system 106 also performs an act 412 of determining a storage location for the digital file 404. For example, the machine learning data management system 106 can analyze a plurality of digital repository platforms and select a file location within a digital repository platform to store the digital file 404. In some implementations, the machine learning data management system 106 selects the file location based on the contents or metadata of the digital file 404. For example, the machine learning data management system 106 stores a first data file type (or first experiment type) in a first digital repository platform and a second data file type (or a second experiment type) in a second digital repository platform. Upon selecting the storage location, the machine learning data management system 106 transmits the digital file 404 to the digital repository platform for storage.

Upon determining the storage location, the machine learning data management system 106 also generates/updates a cross-platform file location database 410 (e.g., the cross-platform file location database 302) based on the storage location. For example, the machine learning data management system 106 can add a row to the cross-platform file location database 410 for the file identifier/digital file 404 and add an indicator of the storage location in a column of the cross-platform file location database 410.

Accordingly, the machine learning data management system 106 maintains metadata regarding the digital file 404 in the cross-platform metadata database 407 and maintains the file location of the digital file 404 in the cross-platform file location database 410 independently from the actual digital file 404. Accordingly, the machine learning data management system 106 can evolve and search the metadata in the cross-platform metadata database 408 independently of the storage location. Moreover, the machine learning data management system 106 can select and independently modify the storage location of the digital file 404. Furthermore, the testing device(s) 402 (or a corresponding client device) can upload the digital file 404 and access the digital file 404 for utilization with machine learning models without the need for information regarding the actual storage location of the digital file 404.

Although FIG. 4 illustrates a single example of a data file in generating the cross-platform metadata database 408 and the cross-platform file location database 410, the machine learning data management system 106 can generate the cross-platform metadata database 408 and the cross-platform file location database 410 utilizing a plurality of data files.

For instance, the machine learning data management system 106 can identify a plurality of file types for a plurality of digital files of machine learning data. To illustrate, the machine learning data management system 106 can identify image types, digital video types, machine learning embedding types or other digital file types. Moreover, each of the digital file types can have required (i.e., via registration) metadata fields corresponding to the digital files. The machine learning data management system 106 can determine metadata fields for the plurality of file types. For instance, the machine learning data management system 106 can access registration files or fields from the cross-platform metadata database corresponding to the particular digital file type.

The machine learning data management system 106 can populate the metadata fields utilizing metadata for the plurality of files of machine learning data. In particular, upon confirming that the machine learning data management system 106 has received the appropriate metadata corresponding to required metadata fields, the machine learning data management system 106 can extract the metadata and populate the required metadata fields for the digital files.

Figure 5:
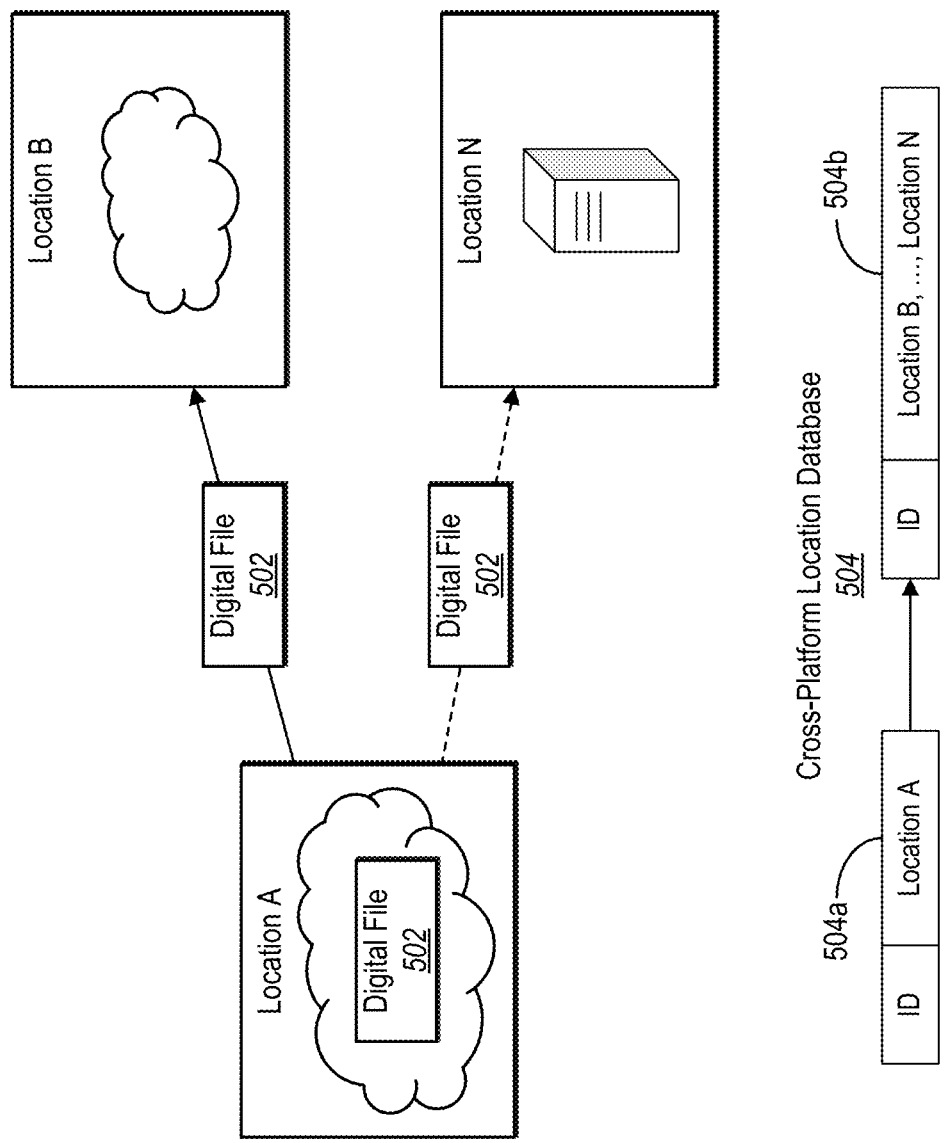
FIG. 5 illustrates updating a cross-platform location database to reflect new digital storage locations of digital files in accordance with one or more embodiments.

As mentioned previously, in some implementations, the machine learning data management system 106 can also update a cross-platform location database in response to movement of digital files from one digital storage location to another (e.g., from one digital repository platform to another). FIG. 5 illustrates updating a cross-platform location database to reflect new digital storage locations of digital files in accordance with one or more embodiments.

In particular, FIG. 5 illustrates a digital file 502 at Location A of a first digital repository platform (e.g., a first cloud service). As illustrated, the machine learning data management system 106 determines one or more new locations for the digital file 502. In particular, FIG. 5 illustrates the machine learning data management system 106 transferring the digital file 502 to a Location B of a second digital repository platform (e.g., a second cloud service). The machine learning data management system 106 can also (optionally) transfer the digital file 502 to additional storage locations, such as location N of an additional digital repository platform. Thus, the machine learning data management system 106 can store the digital file 502 in one, or multiple, storage locations. Moreover, in transferring the digital file 502, the machine learning data management system 106 can maintain the digital file 502 at Location A (by copying the digital file 502) or move the digital file 502 from Location A.

The machine learning data management system 106 can select the new storage locations based on a variety of features or factors. For example, the machine learning data management system 106 can determine a new storage location that is closer to a particular computing device that utilizes the digital file. Similarly, the machine learning data management system 106 can transfer the digital file 502 for cold/long term storage at a different storage location. The machine learning data management system 106 can also transfer the digital file 502 based on overall migration from a first digital repository platform to a second digital repository platform (e.g., an entity is transferring all data from a first service provider to a second service provider).

As shown, in transferring the digital file 502, the machine learning data management system 106 also updates the cross-platform location database 504. In particular, the machine learning data management system 106 changes the location field 504*a* of the cross-platform location database 504 to a modified location field 504*b*. As shown, the modified location field 504*b* can include one or more new locations for the digital file 502. Thus, in response to a subsequent machine learning dataset request, the machine learning data management system 106 can identify the new locations and retrieve the digital file 502.

In circumstances where the cross-platform location database 504 includes multiple locations for the digital file 502, the machine learning data management system 106 can select a location for retrieving the digital file 502. For example, the machine learning data management system 106 can choose between Location and Location N based on distance to the computing need, anticipated speed of retrieval, client preference, or bandwidth at any particular storage location.

Thus, in one or more implementations, the machine learning data management system 106 identifies locations within the plurality of digital repository platforms for a plurality of files of machine learning data. Moreover, the machine learning data management system 106 populates the cross-platform file location database utilizing the locations within the plurality of digital repository platforms.

Although FIG. 5 illustrates an example corresponding to a single digital file, the machine learning data management system 106 can generate and/or update a cross-platform location database utilizing a plurality of digital files. For instance, the machine learning data management system 106 can identify locations within the plurality of digital repository platforms for a plurality of files of machine learning data. Moreover, the machine learning data management system 106 can populate the cross-platform file location database utilizing the locations within the plurality of digital repository platforms.

Accordingly, the machine learning data management system 106 can track and manage digital file location. The machine learning data management system 106 can track multiple locations for a single digital file. Further, the machine learning data management system 106 can provide default locations of different digital file types. The machine learning data management system 106 can select multiple storage locations for digital files, and change these locations invisibly to clients. The machine learning data management system 106 can track digital files moving from one location to another. Moreover, or digital files stored in multiple locations, the machine learning data management system 106 can select the most efficient location to read from.

As mentioned above, the machine learning data management system 106 can also modify a cross-platform metadata database to add new fields (e.g., at registration) and/or to modify fields. For example, FIG. 6 illustrates the machine learning data management system 106 modifying a cross-platform metadata database in accordance with one or more embodiments.

Figure 6:
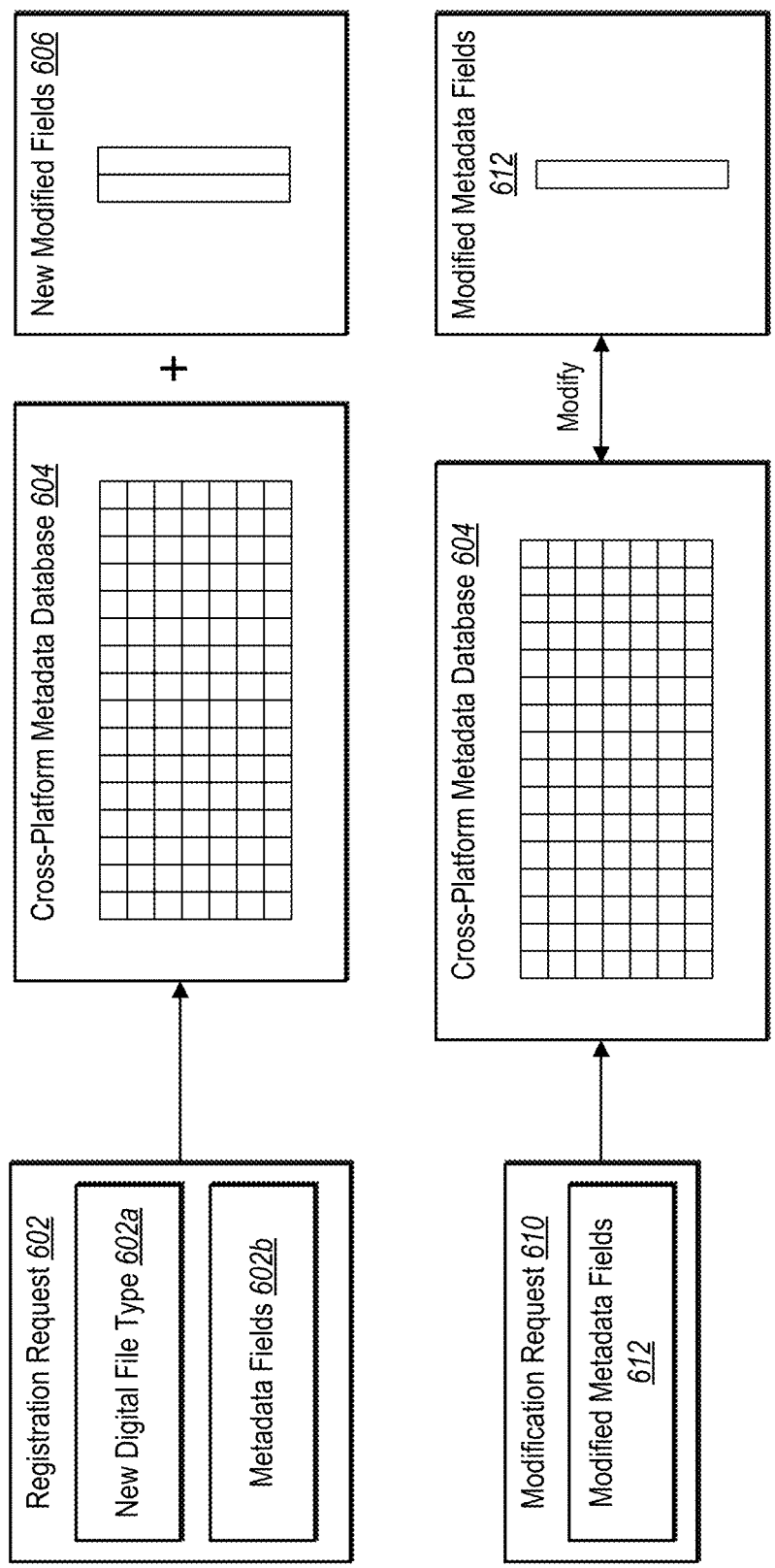
FIG. 6 illustrates modifying a cross-platform metadata database in accordance with one or more embodiments.

In particular, FIG. 6 illustrates the machine learning data management system 106 receiving a registration request 602 (e.g., from a client device). In particular, the registration request 602 includes a new digital file type 602*a* and metadata fields 602*b*. For example, researchers can develop a new biological assay corresponding to a new modality, sensor, or type. Researchers can utilize a user interface of a client device to transmit the registration request 602. The user interface can include user interface elements for providing the new digital file type 602*a* as well as the metadata fields 602*b* (e.g., via a dropdown menu of existing menu fields and/or a text box for entering a new metadata field).

The machine learning data management system 106 can receive and analyze the registration request 602. In some implementations, the machine learning data management system 106 analyzes the cross-platform metadata database 604 before registering the new digital file type 602*a*. For example, the machine learning data management system 106 can analyze the cross-platform metadata database 604 to determine whether an existing digital file type is sufficiently similar to describe, capture, or cover the new digital file type 602*a*. The machine learning data management system 106 can utilize a text similarity model to determine a measure of similarity between the new digital file type 602*a* (and/or the metadata fields 602*b*) relative to existing digital file types (and corresponding metadata fields). The machine learning data management system 106 can then accept or reject the registration request 602 based on the measure of similarity (e.g., if the measure of similarity satisfies a difference/similarity threshold).

Upon receiving and/or analyzing the registration request 602, the machine learning data management system 106 can also modify a cross-platform metadata database 604 (e.g., the cross-platform metadata database 304). For example, the machine learning data management system 106 can compare existing fields in the cross-platform metadata database with the metadata fields 602b to identify new fields 606. The machine learning data management system 106 can then add the new fields 606 to the cross-platform metadata database 604. For example, the machine learning data management system 106 can add columns corresponding to the new fields 606 within the cross-platform metadata database 604.

In some implementations, the machine learning data management system 106 can also modify the cross-platform metadata database 604 in response to a different modification request. For example, the modification request 610 includes modified metadata fields 612 (e.g., for an existing digital file type). Indeed, clients may wish to add, remove, or modify certain metadata fields from an existing digital file type. To illustrate, researchers may wish to convert one-time experimental data files into ongoing, multi-stage experimental data files. To do so, researchers can utilize a client device to submit the modification request 610 with the modified metadata fields 612 indicating different experimental stages for the incremental experimental data files, time periods for the different stages, etc.

Upon registration, the machine learning data management system 106 can require digital file types to align to the information provided during registration. For example, the machine learning data management system 106 can make sure that an additional digital file has metadata corresponding to all of the metadata fields 612 prior to accepting the additional digital file and adding it to the cross-platform metadata database 604. Thus, in some implementations, the machine learning data management system 106 compares received metadata to registered/required metadata fields before accepting a digital file for indexing and storage (e.g., transmission to digital repository platforms).

In a similar circumstance, a client may wish to change the name of certain metadata fields, remove certain fields, or modify the content of certain fields. The modification request 610 can include a variety of different field modifications.

In some implementations, the machine learning data management system 106 can better support forward compatible metadata schema evolution. Indeed, as part of registration, the machine learning data management system 106 can receive an initial metadata schema that includes particular metadata labels, format types (e.g., string, Boolean, numerical, etc.), or other features defining a schema for metadata associated with a particular digital file type. The machine learning data management system 106 can efficiently modify such a schema (e.g., modify labels, format types or other characteristics) within the cross-platform metadata database (e.g., in response to a modification/re-registration request).

As shown, the machine learning data management system 106 can modify the cross-platform metadata database 604 based on the modification request 610. In particular, the machine learning data management system 106 can modify the cross-platform metadata database 604 to reflect the modified metadata fields 612. Notably, the machine learning data management system 106 can generate a modified cross-platform metadata database without necessarily modifying the underlying digital files at their storage location. Thus, the machine learning data management system 106 can independently modify the cross-platform metadata database 604 without expending the computational resources to retrieve and modify the digital files themselves. This allows the machine learning data management system 106 to dynamically and efficiently modify the cross-platform metadata database 604 to more effectively build machine learning datasets from digital files stored at multiple digital repository platforms (without having to access the digital repository platforms to perform modifications).

Over time, the machine learning data management system 106 can build databases that increase in size. Accordingly, the machine learning data management system 106 can also implement procedures to manage the size and storage requirements of a cross-platform metadata database and/or cross-platform file location database. Indeed, the machine learning data management system 106 can identify portions of the databases (e.g., portions older than a threshold time) to place in cold storage (e.g., a storage location that is accessed less frequently and requires fewer maintenance resources). The machine learning data management system 106 can also purge data beyond a certain time threshold. In one or more implementations, the machine learning data management system 106 also utilizes version tracking within the cross-platform metadata database 604 (and/or a cross-platform file location database). In this manner, the machine learning data management system 106 can identify pertinent information that corresponds to different versions as metadata fields are modified or updated over time.

As mentioned previously, the machine learning data management system 106 can also utilize a machine learning training dataset to train a machine learning model. In particular, FIG. 7 illustrates the machine learning data management system 106 training a machine learning model in accordance with one or more embodiments.

Figure 7:
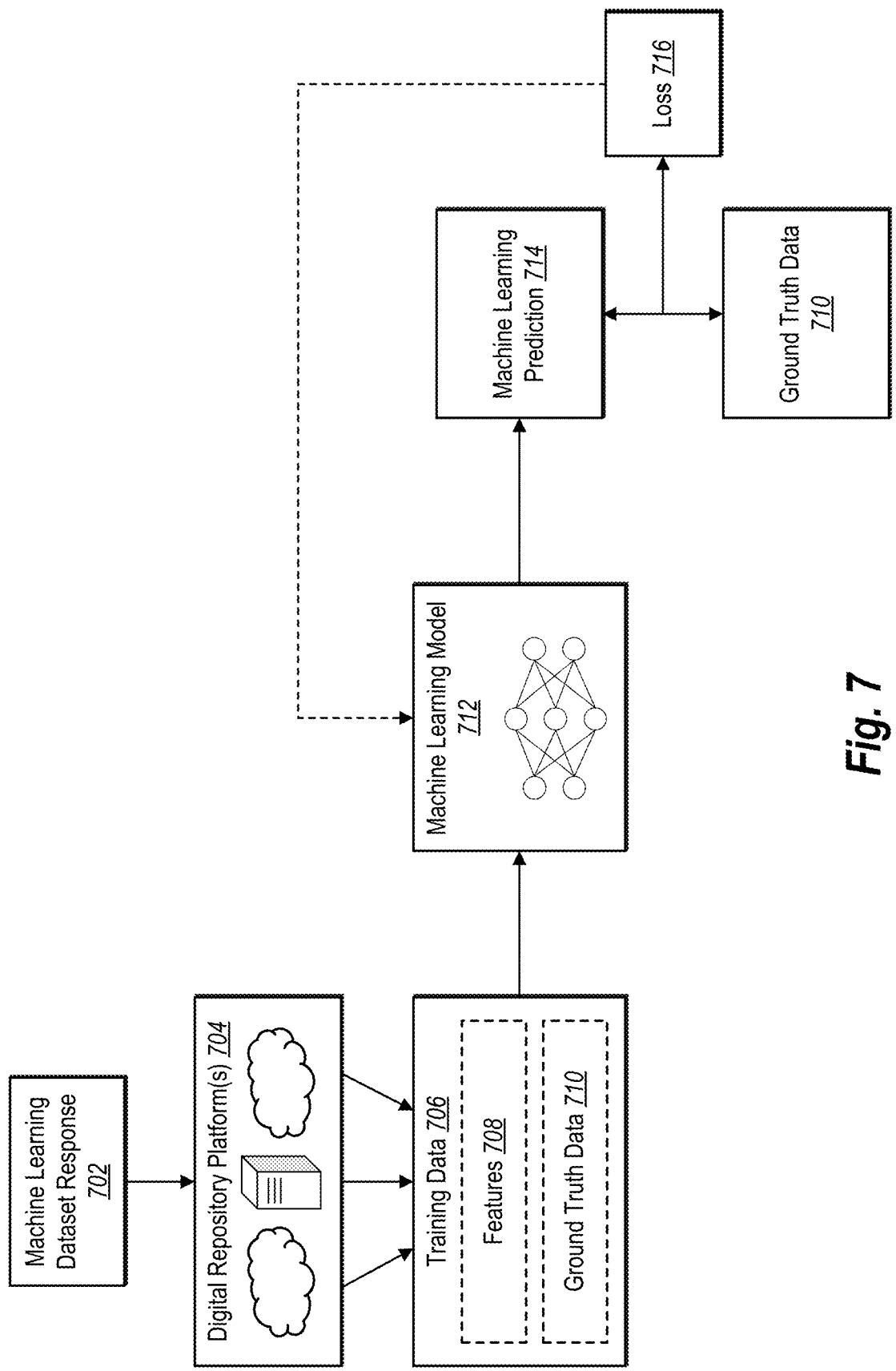
FIG. 7 illustrates training a machine learning model in accordance with one or more embodiments.

Specifically, FIG. 7 illustrates the machine learning data management system 106 generating a machine learning dataset response 702. The machine learning data management system 106 (e.g., via a client device) utilizes the machine learning dataset response to gather digital files for the machine learning dataset from digital repository platform(s) 704. For example, the machine learning dataset response can include a plurality of links, file paths, or other identifiers indicating storage locations for the digital files of the machine learning dataset. The client device can run a script or utilize a separate service to pull the individual digital files from the identified storage locations within the digital repository platform(s) 704.

Upon gathering the digital files, the machine learning data management system 106 can then utilize the digital files as training data 706. For example, the training data 706 can include features 708 and/or ground truth data 710 for training a machine learning model 712. For instance, the features 708 can include compounds, genes, proteins, digital images, digital videos, sensor data, time data, or data embeddings corresponding to certain assays or other tech-bio information. The machine learning model 712 can analyze this input information and generate a machine learning prediction. For example, the machine learning prediction 714 can reflect a measure of similarity between genes, a predicted efficacy of a compound corresponding to a gene or protein, a measure of relatedness between a gene and a disease, a predicted protein three-dimensional structure, or other data predictions for populating a map of biology.

As shown, the machine learning data management system 106 can compare the machine learning prediction 714 with the ground truth data 710 (e.g., a measured experimental assay, a measured similarity, a measured relatedness, a known protein structure, a known portion of a map of biology, etc.) and determine a loss 716. For example, the machine learning data management system 106 can utilize a loss function such as mean squared error loss (MSE), mean absolute error loss, binary cross-entropy loss, categorical cross-entropy loss, sparse categorical cross-entropy loss, hinge loss, Huber loss, and/or Kullback-leibler divergence.

Based on the loss 716, the machine learning data management system 106 can modify parameters of the machine learning model 712. For example, the machine learning data management system 106 can utilize gradient descent and back-propagation to modify parameters of the machine learning model to reduce the loss 716 (e.g., to make predictions align more accurately with ground truth data). The machine learning data management system 106 can iteratively repeat the process illustrated in FIG. 7 (e.g., until utilizing all of the training data 706, reaching a threshold number of iterations, or until satisfying a threshold convergence measure).

In some implementations, the machine learning data management system 106 can take information generated from the machine learning model 712 and store the information (e.g., utilizing digital repository platforms, a cross-platform metadata database, and cross-platform location database as described above). For example, the machine learning data management system 106 can utilize the machine learning model 712 to generate embeddings or feature representations (e.g., feature vectors) from the features 708. The machine learning data management system 106 can store the embeddings or feature representations as digital files.

As mentioned above, the machine learning data management system 106 can also utilize predictions or embeddings generated by a machine learning model. For example, the machine learning data management system 106 can train a machine learning model to generate embeddings where distance between embeddings in a feature space represents similarity (e.g., biological similarity). The machine learning data management system 106 can generate embeddings from input features utilizing a machine learning model, and then store and retrieve these embeddings utilizing a cross-platform metadata database and/or cross-platform file location database as described above. The machine learning data management system 106 can also compare these embeddings to generate various maps of biology.

FIGS. 1-7, the corresponding text, and the examples provide a number of different systems, methods, and non-transitory computer readable media for generating a machine learning dataset response. In addition to the foregoing, embodiments can also be described in terms of flowcharts comprising acts for accomplishing a particular result. For example, FIG. 8 illustrates a flowchart of an example sequence of acts in accordance with one or more embodiments.

Figure 8:
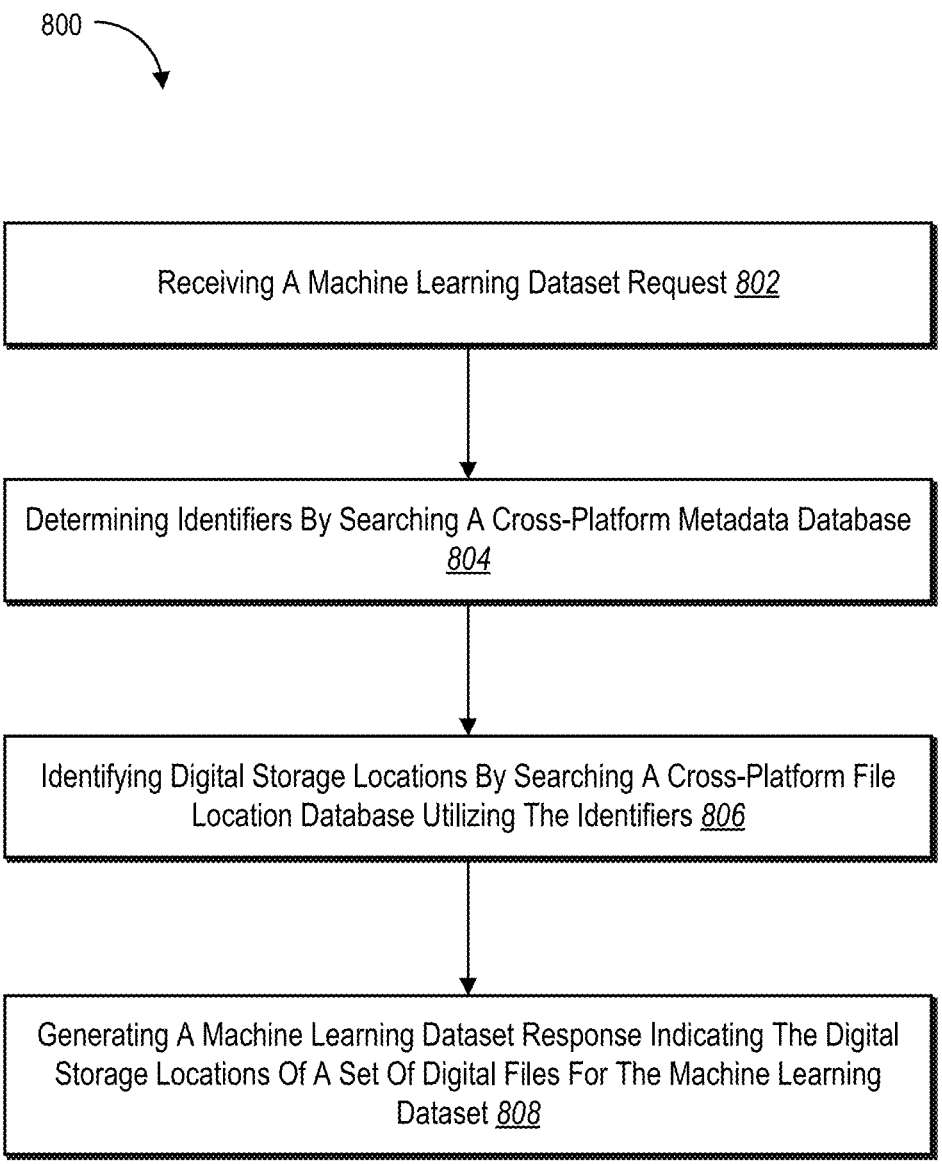
FIG. 8 illustrates an example series of acts for generating a machine learning dataset response in accordance with one or more embodiments.

While FIG. 8 illustrates acts according to some embodiments, alternative embodiments may omit, add to, reorder, and/or modify any of the acts shown in FIG. 8. The acts of FIG. 8 can be performed as part of a method (e.g., a computer-implemented method). Alternatively, a non-transitory computer readable medium can comprise instructions, that when executed by one or more processors (e.g., at least one processor), cause a computing device to perform the acts of FIG. 8. In still further embodiments, a system can perform the acts of FIG. 8. Additionally, the acts described herein may be repeated or performed in parallel with one another or in parallel with different instances of the same or other similar acts.

FIG. 8 illustrates an example series of acts 800 for generating a machine learning dataset response. The series of acts 800 can include acts 802-808 of receiving a machine learning dataset request; determining identifiers by searching a cross-platform metadata database; identifying digital storage locations by searching a cross-platform file location database utilizing the identifiers; and generating a machine learning dataset response indicating the digital storage locations of a set of digital files for the machine learning dataset.

For example, in one or more embodiments, the acts 802-806 include receiving, via one or more servers from a requestor device, a machine learning dataset request comprising one or more characteristics for a machine learning dataset; determining identifiers for a set of digital files for the machine learning dataset by searching, via the one or more servers utilizing the one or more characteristics, a cross-platform metadata database comprising metadata for a plurality of digital files stored across a plurality of digital repository platforms storing machine learning data; identifying, via the one or more servers, digital storage locations corresponding to the plurality of digital repository platforms for the set of digital files for the machine learning dataset by searching a cross-platform file location database utilizing the identifiers; and generating a machine learning dataset response, for the requestor device, indicating the digital storage locations of the set of digital files for the machine learning dataset.

In one or more implementations, the series of acts 800 include generating the cross-platform metadata database by: identifying a plurality of file types for a plurality of files of machine learning data; determining metadata fields for the plurality of file types; and populating the metadata fields utilizing metadata for the plurality of files of machine learning data.

In addition, in one or more implementations, the series of acts 800 includes generating the cross-platform file location database by: identifying locations within the plurality of digital repository platforms for the plurality of files of machine learning data; and populating the cross-platform file location database utilizing the locations within the plurality of digital repository platforms.

Further, in some implementations, the series of acts 800 includes receiving, from a client device, a new digital file of machine learning data; selecting a storage location within the plurality of digital repository platforms for the new digital file of the machine learning data; and adding the storage location for the new digital file of the machine learning data to the cross-platform file location database.

In one or more implementations, the series of acts 800 includes identifying metadata for the new digital file of the machine learning data; and adding the metadata for the new digital file of the machine learning data to the cross-platform metadata database. Moreover, in one or more implementations, the series of acts 800 includes migrating a set of machine learning data from a first digital storage location of a first digital repository platform of the plurality of digital repository platforms to a second digital storage location of a second digital repository platform of the plurality of digital repository platforms; and modifying the cross-platform file location database to indicate the second digital storage location for the set of machine learning data.

In addition, in some implementations, for the series of acts 800 receiving the machine learning dataset request comprises receiving a request for phenomic digital images, invivomic digital videos, or machine learning embeddings satisfying the one or more characteristics, and generating the machine learning dataset response comprises transmitting one or more digital storage locations for the phenomic digital images, the invivomic digital videos, or the machine learning embeddings.

Further, in one or more implementations, the series of acts 800 includes modifying a metadata field of the cross-platform metadata database; and in response to an additional query, searching the cross-platform metadata database according to the modified metadata field. Moreover, in some implementations, the series of acts 800 includes training a machine learning model utilizing the set of digital files for the machine learning dataset.

In some implementations, the series of acts 800 includes registering a new file-type for the metadata database by identifying one or more new metadata fields for the new file-type; and modifying the cross-platform metadata database by adding the one or more new metadata fields. In addition, in one or more implementations, the series of acts 800 includes in response to receiving an instance of the new file-type: identifying metadata corresponding to the instance of the new file-type; populating the one or more metadata fields utilizing the metadata; and modifying the cross-platform file location database to include a location for the instance of the new file-type.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
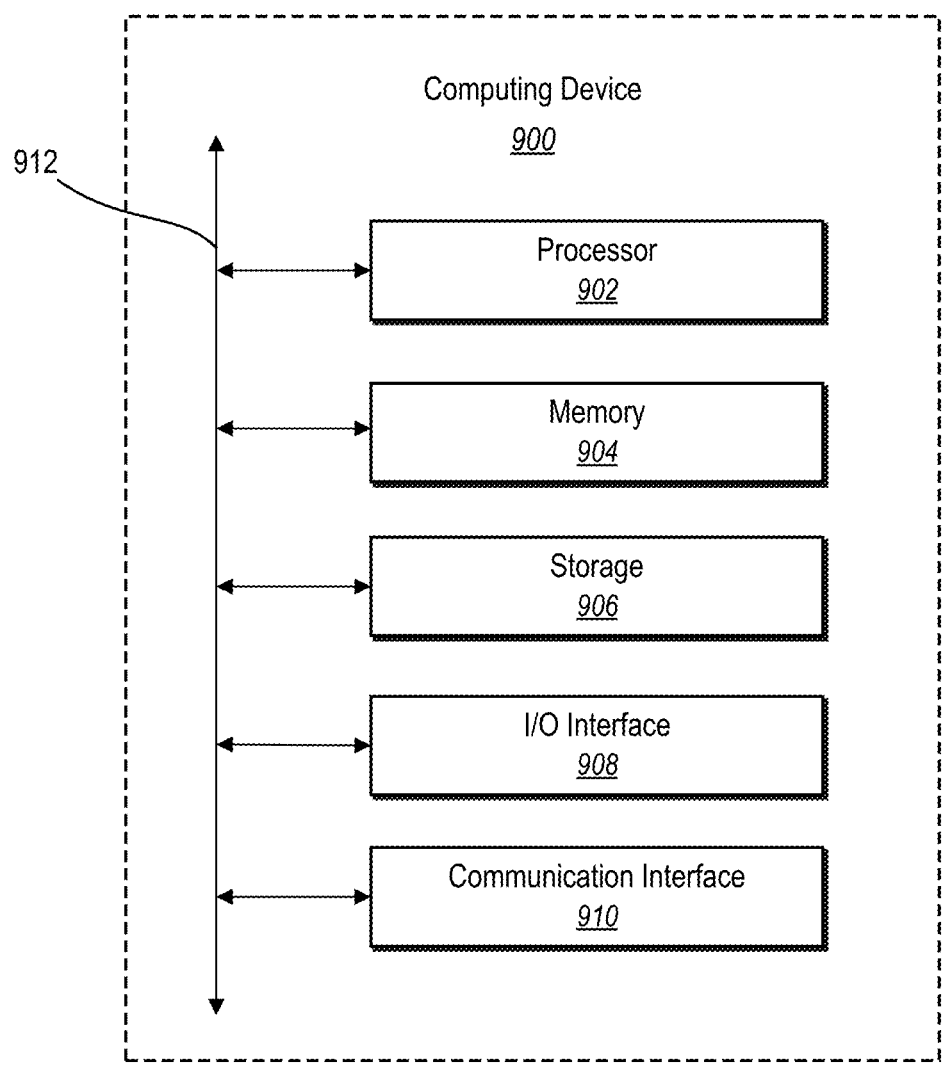
FIG. 9 illustrates a block diagram of a computing device for implementing one or more embodiments.

FIG. 9 illustrates a block diagram of an example computing device 900 that may be configured to perform one or more of the processes described above. One will appreciate that one or more computing devices, such as the computing device 900 may represent the computing devices described above. In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In one or more implementations, various computing devices can communicate over a computer network. This disclosure contemplates any suitable network. As an example, and not by way of limitation, one or more portions of a network may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these.

In particular embodiments, the computing device 900 can include a client device that includes a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device one or more Hyper Text Markup Language ("HTML") files responsive to the HTTP request. The client device may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the tech-bio exploration system 104 may include a variety of servers, sub-systems, programs, modules, logs, and data stores. In particular embodiments, the tech-bio exploration system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The tech-bio exploration system 104 may also include suitable components such as network interfaces, security mechanisms, load balancers, failover servers, management-and-network-operations consoles, other suitable components, or any suitable combination thereof. In particular embodiments, the tech-bio exploration system 104 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the tech-bio exploration system 104 and one or more client devices. An action logger may be used to receive communications from a web server about a user's actions on or off the tech-bio exploration system 104. In conjunction with the action log, a third-party-content-object log may be maintained of user exposures to third-party-content objects. A notification controller may provide information regarding content objects to a client device. Information may be pushed to a client device as notifications, or information may be pulled from a client device responsive to a request received from the client device. Authorization servers may be used to enforce one or more privacy settings of the users of the tech-bio exploration system 104. A privacy setting of a user determines how particular information associated with a user can be shared. The authorization server may allow users to opt in to or opt out of having their actions logged by the tech-bio exploration system 104 or shared with other systems, such as, for example, by setting appropriate privacy settings. Third-party-content-object stores may be used to store content objects received from third parties. Location stores may be used for storing location information received from a client device associated with users.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating a cross-platform metadata database comprising a plurality of file identifiers and comprising metadata for a plurality of digital files stored across a plurality of digital repository platforms storing machine learning data;
generating a cross-platform file location database comprising the plurality of file identifiers and comprising a plurality of file locations for the plurality of digital files across the plurality of digital repository platforms storing machine learning data;
receiving, via one or more servers from a requestor device, a machine learning dataset request comprising one or more characteristics for a machine learning dataset;
determining, via the one or more servers, file identifiers for a set of digital files for the machine learning dataset by searching, the metadata of the cross-platform metadata database utilizing the one or more characteristics from the machine learning dataset request;
searching, via the one or more servers, the plurality of file identifiers of the cross-platform file location database utilizing the file identifiers for the set of digital files for the machine learning dataset determined from the cross-platform metadata database to identify digital storage locations corresponding to the plurality of digital repository platforms for the set of digital files for the machine learning dataset by:
identifying a first storage location for a first digital file stored at a first digital repository platform utilizing a first file identifier; and
identifying a second storage location for a second digital file stored at a second digital repository platform utilizing a second file identifier;
generating a machine learning dataset response, for the requestor device, indicating the digital storage locations of the set of digital files for the machine learning dataset, the machine learning dataset response comprising the first storage location for the first digital file stored at the first digital repository platform and the second storage location for the second digital file stored at the second digital repository platform; and
training a machine learning model utilizing the set of digital files for the machine learning dataset.

2. The computer-implemented method of claim 1, further comprising generating the cross-platform metadata database by:
identifying a plurality of file types for a plurality of files of machine learning data;
determining metadata fields for the plurality of file types; and
populating the metadata fields utilizing metadata for the plurality of files of machine learning data.

3. The computer-implemented method of claim 2, further comprising generating the cross-platform file location database by:
identifying locations within the plurality of digital repository platforms for the plurality of files of machine learning data; and populating the cross-platform file location database utilizing the locations within the plurality of digital repository platforms.

4. The computer-implemented method of claim 1, further comprising:
receiving, from a client device, a new digital file of machine learning data;
selecting a storage location within the plurality of digital repository platforms for the new digital file of the machine learning data; and
adding the storage location for the new digital file of the machine learning data to the cross-platform file location database.

5. The computer-implemented method of claim 4, further comprising:
identifying metadata for the new digital file of the machine learning data; and
adding the metadata for the new digital file of the machine learning data to the cross-platform metadata database.

6. The computer-implemented method of claim 1, further comprising:
migrating a set of machine learning data from a first digital storage location of a first digital repository platform of the plurality of digital repository platforms to a second digital storage location of a second digital repository platform of the plurality of digital repository platforms; and
modifying the cross-platform file location database to indicate the second digital storage location for the set of machine learning data.

7. The computer-implemented method of claim 1, wherein:
receiving the machine learning dataset request comprises receiving a request for phenomic digital images, invivomic digital videos, or machine learning embeddings satisfying the one or more characteristics, and
generating the machine learning dataset response comprises transmitting one or more digital storage locations for the phenomic digital images, the invivomic digital videos, or the machine learning embeddings.

8. The computer-implemented method of claim 1, further comprising:
modifying a metadata field of the cross-platform metadata database; and
in response to an additional query, searching the cross-platform metadata database according to the modified metadata field.

9. The computer-implemented method of claim 1, wherein:
receiving the machine learning dataset request comprises receiving a request for three-dimensional proteins or compound information; and
generating the machine learning dataset response comprises transmitting one or more digital storage locations for the three-dimensional proteins or the compound information.

10. A system comprising:
at least one processor; and
at least one non-transitory computer-readable storage medium storing instructions that, when executed by the at least one processor, cause the system to:
generate a cross-platform metadata database comprising a plurality of file identifiers and comprising metadata for a plurality of digital files stored across a plurality of digital repository platforms storing machine learning data;
generate a cross-platform file location database comprising the plurality of file identifiers and comprising a plurality of file locations for the plurality of digital files across the plurality of digital repository platforms storing machine learning data;
receive, from a requestor device, a machine learning dataset request comprising one or more characteristics for a machine learning dataset;
determine, via one or more servers, file identifiers for a set of digital files for the machine learning dataset by searching the metadata of the cross-platform metadata database utilizing the one or more characteristics from the machine learning dataset request;
search, via the one or more servers, the plurality of file identifiers of the cross-platform file location database utilizing the file identifiers for the set of digital files for the machine learning dataset determined from the cross-platform metadata database to identify digital storage locations corresponding to the plurality of digital repository platforms for the set of digital files for the machine learning dataset by:
identifying a first storage location for a first digital file stored at a first digital repository platform utilizing a first file identifier; and
identifying a second storage location for a second digital file stored at a second digital repository platform utilizing a second file identifier; and
generate a machine learning dataset response, for the requestor device, indicating the digital storage locations of the set of digital files for the machine learning dataset, the machine learning dataset response comprising the first storage location for the first digital file stored at the first digital repository platform and the second storage location for the second digital file stored at the second digital repository platform; and
train a machine learning model utilizing the set of digital files for the machine learning dataset.

11. The system of claim 10, further comprising instructions that, when executed by the at least one processor, cause the system to generate the cross-platform metadata database by:
identifying a plurality of file types for a plurality of files of machine learning data;
determining metadata fields for the plurality of file types; and
populating the metadata fields utilizing metadata for the plurality of files of machine learning data.

12. The system of claim 11, further comprising instructions that, when executed by the at least one processor, cause the system to generate the cross-platform file location database by:
identifying locations within the plurality of digital repository platforms for the plurality of files of machine learning data; and
populating the cross-platform file location database utilizing the locations within the plurality of digital repository platforms.

13. The system of claim 10, further comprising instructions that, when executed by the at least one processor, cause the system to:
receive a new digital file of machine learning data;
select a storage location within the plurality of digital repository platforms for the new digital file of the machine learning data;

add the storage location for the new digital file of the machine learning data to the cross-platform file location database; and add metadata for the new digital file of the machine learning data to the cross-platform metadata database.

14. The system of claim 10, further comprising instructions that, when executed by the at least one processor, cause the system to:

migrate a set of machine learning data from a first digital storage location of a first digital repository platform of the plurality of digital repository platforms to a second digital storage location of a second digital repository platform of the plurality of digital repository platforms; and modify the cross-platform file location database to indicate the second digital storage location for the set of machine learning data.

15. The system of claim 10, further comprising instructions that, when executed by the at least one processor, cause the system to:

receive the machine learning dataset request by receiving a request for phenomic digital images, invivomic digital videos, or machine learning embeddings satisfying the one or more characteristics, and generate the machine learning dataset response by transmitting one or more digital storage locations for the phenomic digital images, the invivomic digital videos, or the machine learning embeddings.

16. A non-transitory computer-readable medium storing instructions that, when executed by at least one processor, cause a computing device to:

generate a cross-platform metadata database comprising a plurality of file identifiers and comprising metadata for a plurality of digital files stored across a plurality of digital repository platforms storing machine learning data;

generate a cross-platform file location database comprising the plurality of file identifiers and comprising a plurality of file locations for the plurality of digital files across the plurality of digital repository platforms storing machine learning data;

receive, from a requestor device, a machine learning dataset request comprising one or more characteristics for a machine learning dataset;

determine, via one or more servers, file identifiers for a set of digital files for the machine learning dataset by searching the metadata of the cross-platform metadata database utilizing the one or more characteristics from the machine learning dataset request;

search, via the one or more servers, the plurality of file identifiers of the cross-platform file location database utilizing the file identifiers for the set of digital files for the machine learning dataset determined from the cross-platform metadata database to identify digital storage locations corresponding to the plurality of digital repository platforms for the set of digital files for the machine learning dataset by:

identifying a first storage location for a first digital file stored at a first digital repository platform utilizing a first file identifier; and identifying a second storage location for a second digital file stored at a second digital repository platform utilizing a second file identifier;

generate a machine learning dataset response, for the requestor device, indicating the digital storage locations of the set of digital files for the machine learning dataset, the machine learning dataset response comprising the first storage location for the first digital file stored at the first digital repository platform and the second storage location for the second digital file stored at the second digital repository platform; and train a machine learning model utilizing the set of digital files for the machine learning dataset.

17. The non-transitory computer-readable medium of claim 16, further comprising instructions that, when executed by the at least one processor, cause the computing device to:

receive a new digital file of machine learning data;

select a storage location within the plurality of digital repository platforms for the new digital file of the machine learning data; and add the storage location for the new digital file of the machine learning data to the cross-platform file location database.

18. The non-transitory computer-readable medium of claim 17, further comprising instructions that, when executed by the at least one processor, cause the computing device to:

identify metadata for the new digital file of the machine learning data; and add the metadata for the new digital file of the machine learning data to the cross-platform metadata database.

19. The non-transitory computer-readable medium of claim 16, further comprising instructions that, when executed by the at least one processor, cause the computing device to:

migrate a set of machine learning data from a first digital storage location of a first digital repository platform of the plurality of digital repository platforms to a second digital storage location of a second digital repository platform of the plurality of digital repository platforms; and modify the cross-platform file location database to indicate the second digital storage location for the set of machine learning data.

20. The non-transitory computer-readable medium of claim 16, further comprising instructions that, when executed by the at least one processor, cause the computing device to:

receive the machine learning dataset request by receiving a request for phenomic digital images, invivomic digital videos, or machine learning embeddings satisfying the one or more characteristics, and generate the machine learning dataset response by transmitting one or more digital storage locations for the phenomic digital images, the invivomic digital videos, or the machine learning embeddings.

* * * * *